Aug. 4, 1964

H. P. RAABE 3,143,734

SPEED INDICATOR

Filed Jan. 30, 1957

INVENTOR.
HERBERT P. RAABE
BY
ATTORNEY
AGENT

Aug. 4, 1964
H. P. RAABE
3,143,734
SPEED INDICATOR
Filed Jan. 30, 1957
4 Sheets-Sheet 2
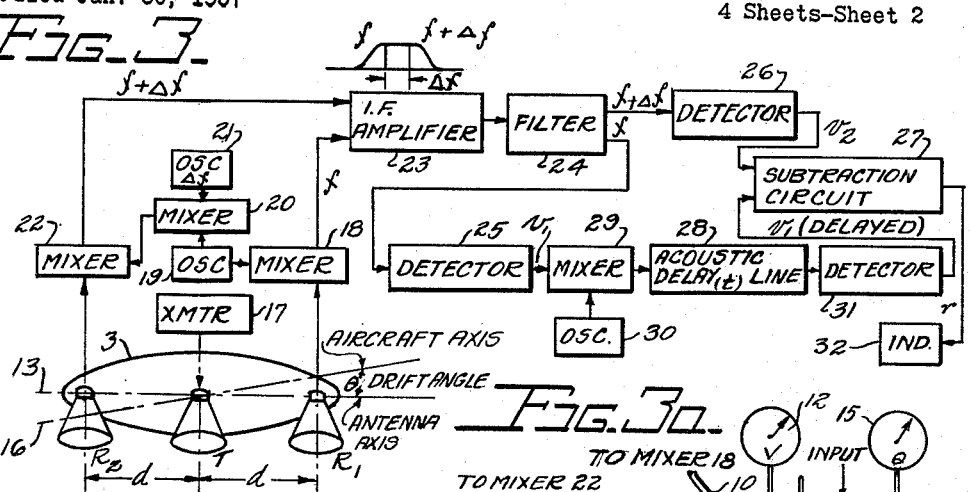
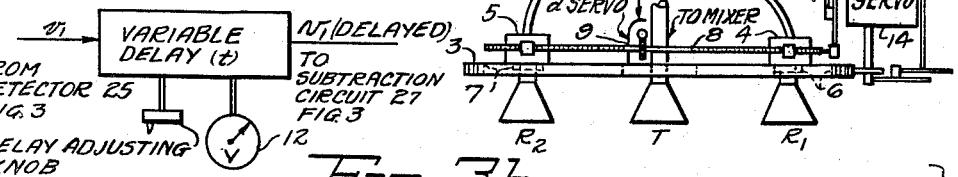
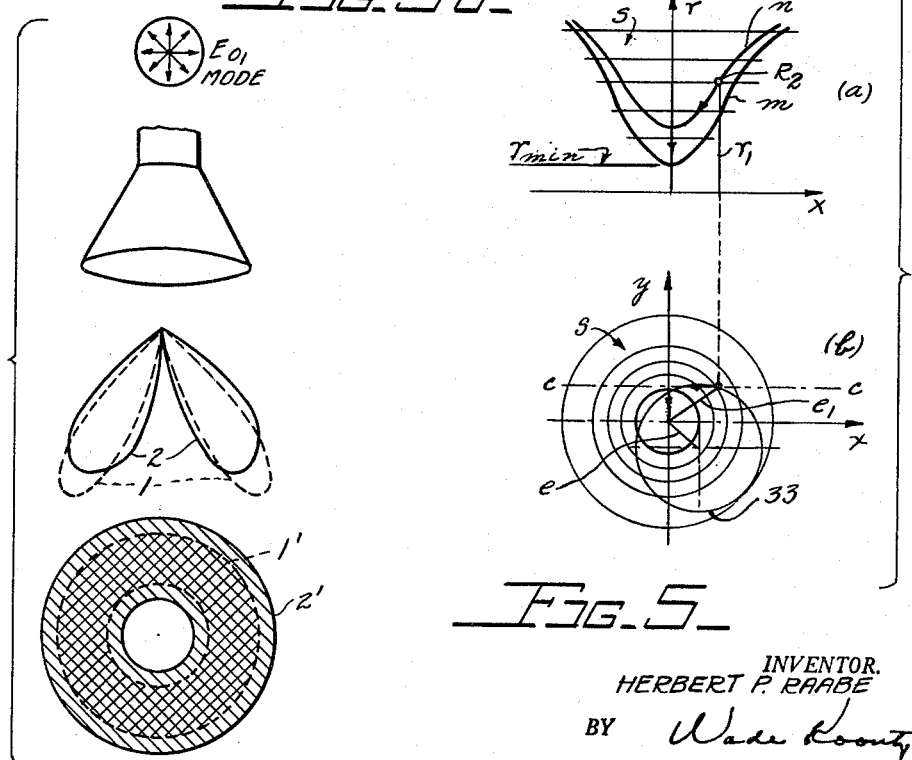
INVENTOR.
HERBERT P. RAABE
BY
ATTORNEY
AGENT Aug. 4, 1964

H. P. RAABE 3,143,734

SPEED INDICATOR

Filed Jan. 30, 1957

INVENTOR.
HERBERT P. RAABE

Aug. 4, 1964   H. P. RAABE   3,143,734
SPEED INDICATOR
Filed Jan. 30, 1957   4 Sheets-Sheet 4
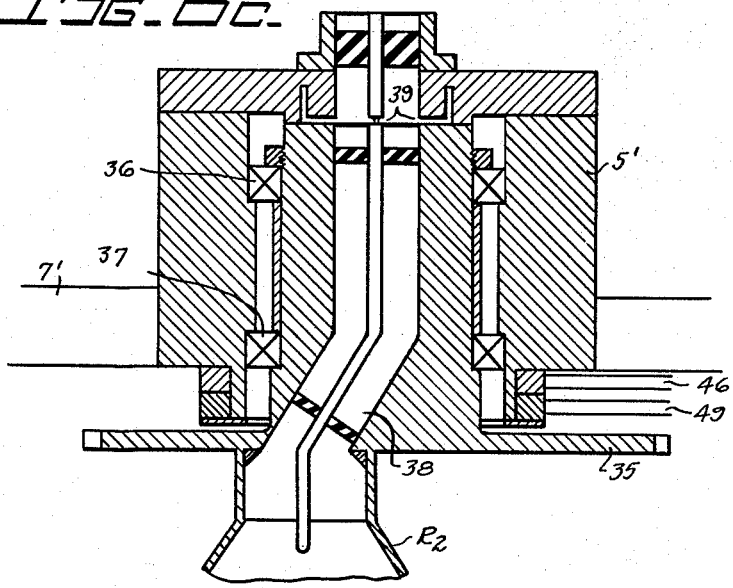
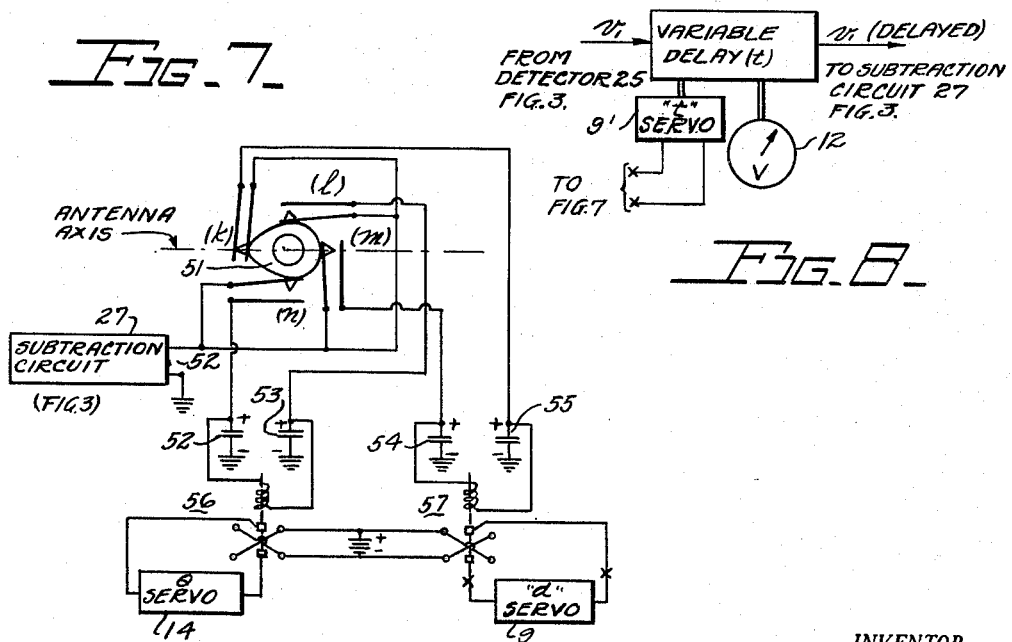
INVENTOR.
HERBERT P. RAABE
BY
ATTORNEY
AGENT 3,143,734
SPEED INDICATOR
Herbert P. Raabe, St. Paul, Minn., assignor to the United States of America as represented by the Secretary of the Air Force
Filed Jan. 30, 1957, Ser. No. 637,335
3 Claims. (Cl. 343—9)
(Granted under Title 35, U.S. Code (1952), sec. 266)

The invention described herein may be manufactured and used by or for the United States Government for governmental purposes without payment to me of any royalty thereon.

It is the purpose of this invention to provide apparatus for determining the magnitude and direction of the velocity vector of an aircraft.

As is well known, when the air mass through which an aircraft is traveling has motion relative to the earth the velocity of the aircraft relative to the earth and, except for axial winds, its direction of travel relative to the earth are affected. The ground velocity vector is the sum of the vector representing the aircraft true air speed and the vector representing wind velocity. Knowledge of the magnitude and direction of the ground velocity vector is necessary for the accurate navigation of the aircraft.

The described invention utilizes high frequency radio waves for the above purpose. The aircraft is provided with three equally spaced antennas arranged in a straight line on a horizontal platform situated on the underside of the fuselage and rotatable about a vertical axis. Horizontal stabilization of the platform is not required. The center antenna is the transmitting antenna and continuously illuminates the ground beneath the aircraft with high frequency radiant energy. The beam of the transmitting antenna is preferably circular in cross section and relatively broad, 60° for example, which permits a small antenna of simple construction. The remaining two antennas are for reception of the energy reflected from the ground and may be similar in construction to the transmitting antenna. An arrangement for equally varying the spacings between the transmitting and receiving antennas is provided.

The operation of the device is based upon the fact that the received signal reflected from the earth is not changed in character if the positions in space of the transmitting and receiving antennas are interchanged. Thus, if the direction through the three antennas coincides with the ground direction of the aircraft, the signal received at the first antenna will be duplicated at the second receiving antenna after an interval equal to the time required for the aircraft to travel the distance between the transmitting antenna and the receiving antennas. This is true since at the end of this interval the transmitting antenna and the second receiving antenna occupy the same positions in space that were occupied at the start of the interval by the first receiving antenna and the transmitting antenna, respectively.

In the practical utilization of this principle the signal received by the first receiving antenna is delayed for a fixed interval and subtracted from the signal received by the second receiving antenna. The angular position of the antenna platform and the antenna spacings are adjusted, manually or automatically, to reduce this difference signal to a minimum which theoretically is zero. This null will occur when the antennas are aligned with the velocity vector and have such separation that the aircraft travels the distance of the antenna separation during the fixed delay interval. Therefore, when the null condition is achieved, the antenna alignment, as indicated by the angular position of the antenna platform, provides the direction of the velocity vector and the antenna spacing provides its magnitude. It is also feasible for the antenna separation to be fixed and the signal delay varied to determine the vector magnitude.

Among the advantages of the described system are its ability to operate equally well at high and low altitudes and its simplicity. The latter is due principally to the use of continuous rather than pulsed transmission, the use of wide beam rather than highly directional antennas, the absence of signal switching and the fact that a horizontally stabilized platform is not required.

A more detailed description of the invention will be given in connection with the specific embodiments thereof shown in the accompanying drawings, in which FIG. 1 is a schematic drawing illustrating the nature of the reflected signal during continuous illumination of the ground beneath an airplane by high frequency radiant energy;

FIG. 3 is a block diagram of the circuits employed in the described apparatus;

FIG. 3a shows the apparatus for adjusting antenna orientation and separation in FIG. 3;

FIG. 3b is a modification of FIG. 3 employing signal delay rather than antenna separation as a variable parameter;

FIG. 4 illustrates the type antenna employed in the described velocity vector determining apparatus;

FIG. 5 illustrates the nature of the error signal obtained in the circuit of FIG. 3;

Figure 6A:
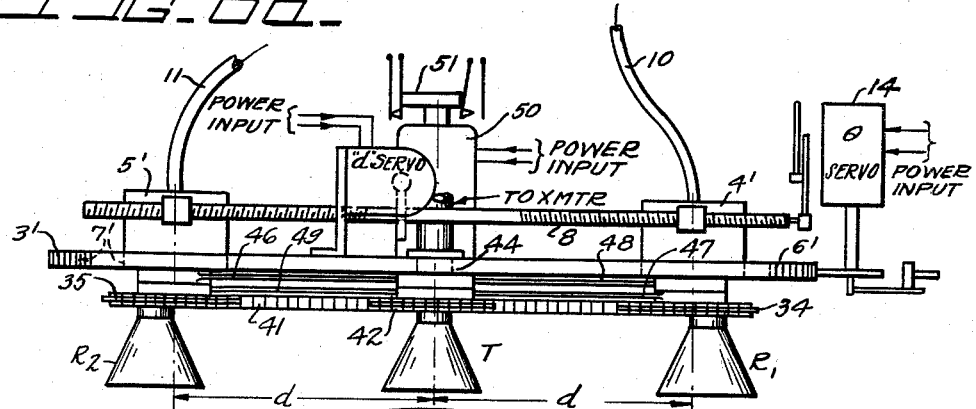
Figure 6B:
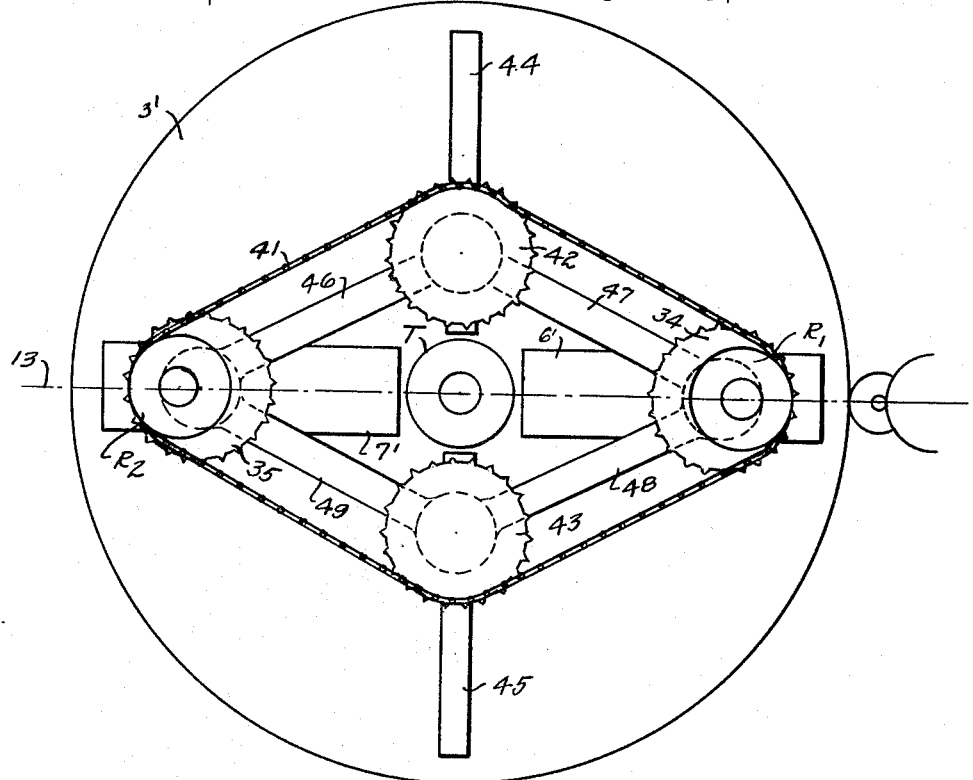

FIGS. 6a–b–c show mechanical details of the antenna supporting and adjusting structure in a self-adjusting velocity vector determining device; and FIG. 7 shows the circuits employed for control of the antenna direction and separation adjusting servos in the self-adjusting embodiment.

Figure 1:
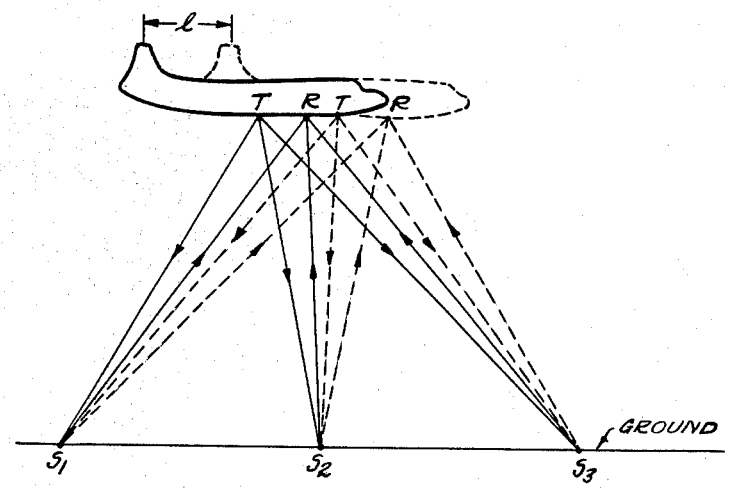

Referring to FIG. 1, T and R represent transmitting and receiving antennas, respectively, located on the under side of an aircraft and directed vertically downward toward the ground. The antennas may simply be the flared ends of waveguides, as shown in FIG. 4, having a wide beam of circular cross section. Scatterers or reflectors $s_1$, $s_2$ and $s_3$ are located on the earth's surface beneath the aircraft, $s_1$ and $s_3$ being near the outer limit of the antenna beams and $s_2$ being near the center of the antenna beams. High frequency energy is continuously radiated toward the ground by antenna T and reflections thereof from the scatterers on the ground, as represented by $s_1$, $s_2$ and $s_3$, are received by receiving antenna R. As the aircraft moves through a distance $l$ it is evident from the drawing that the transmission path T–$s_1$–R increases, path T–$s_3$–R decreases and path T–$s_2$–R undergoes little change. If the distance $l$ equals one wavelength then, for a beamwidth of about 60°, return signals at the outer edge of the beam, such as from $s_1$ and $s_3$, will undergo a full wavelength change in transmission path length and consequently a full cycle phase change at antenna R, return signals from the center of the beam, as from $s_2$, will undergo very little phase change, and return signals from scatterers located between the outer edge and the center of the beam will experience various degrees of phase change between these limits depending upon the location of the scatterers. The total signal at antenna R, which is the vector sum of the return signals from all the scatterers in the illuminated field, will therefore vary in amplitude in a random manner as the aircraft travels through space.

Figure 2:
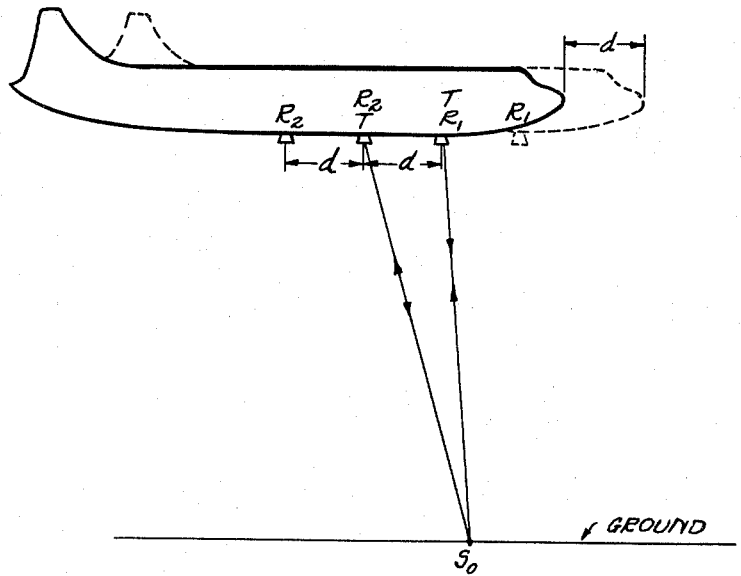
FIG. 2 illustrates the basic principle of operation of the described apparatus for determining the velocity vector of an aircraft.

Referring to FIG. 2, T, $R_1$ and $R_2$ represent a transmitting antenna and first and second receiving antennas, respectively, arranged in a straight line on the under side of an aricraft and separated by the distance $d$. The antennas point straight downward toward the earth beneath the aircraft and may be of the type shown in FIG. 4 consisting of a flared extension of a circular waveguide carrying energy in the $E_{01}$ mode. The transmitting antenna T has the beam pattern 1 and illuminates the earth over the ring 1'. The receiving antennas $R_1$ and $R_2$ are similar and their parameters are preferably sufficiently different from those of antenna T to provide the beam pattern 2 and to receive reflections from scatterers located on the ground within a ring 2' slightly larger than the ring 1' of antenna T.

Consider the three antennas to be aligned in the direction in which the aircraft is traveling, i.e., in the direction of the velocity vector, and $s_0$ to represent any scatterer illuminated by the transmitting antenna. It is clear from the drawing that the signal received at any instant by antenna $R_1$ from scatterer $s_0$ will be duplicated at antenna $R_2$ when the aircraft has moved through a distance $d$ to the position shown by dotted lines. The reason for this is that after moving the distance $d$ antennas T and $R_2$ occupy the exact positions in space occupied by antennas $R_1$ and T at the earlier instant and, therefore, the transmission paths between transmitting and receiving antennas via the scatterer $s_0$ are identical except for the direction of transmission. Consequently, the signals received at the two instants are identical. Since the total signal at the receiving antennas is the vector sum of the signals from all the illuminated scatterers, it follows that the total signal a $R_1$ is similarly duplicated at $R_2$ after the aircraft has moved the distance $d$.

From the above it is apparent that if the signal at $R_1$ is delayed a fixed amount and subtracted from the signal at $R_2$ the difference theoretically will be zero if the antennas are aligned with the velocity vector and $$d = Vt$$

where V is the magnitude of the velocity vector and $t$ is the amount of the fixed delay. If these conditions are not satisfied an exact interchange of transmitting and receiving antennas can not occur and a finite difference signal will be present. This difference signal can be reduced to zero or a null by appropriate adjustment of the antenna alignment direction and the distance $d$. When a null adjustment has been attained, the alignment direction of the antennas is the same as that of the velocity vector and drift angle of the aircraft is the angle between the antenna direction and the longitudinal or heading axis of the aircraft. The magnitude of the velocity vector is available from $d$ through the relationship $$v = \frac{d}{t}$$

FIGS. 3 and 3a illustrate schematically apparatus for obtaining V and the drift angle by the above method. Referring to these figures, antennas T, $R_1$ and $R_2$ are mounted on a rotatable platform 3 with provision for adjusting the antenna separation $d$ as best seen in FIG. 3a. The antennas $R_1$ and $R_2$ are supported from guide blocks 4 and 5 which run in aligned radial slots 6 and 7 in platform 3. The guide blocks are positioned by lead screw 8 having oppositely threaded ends and driven by "$d$" servo 9 mounted on the platform and controlled over a suitable input circuit. The guide blocks 4 and 5 also contain suitable transition networks between the flexible coaxial cables 10 and 11 and the circular waveguides leading to antennas $R_1$ and $R_2$. A dial 12 may be directly geared to lead screw 8 for indicating the magnitude of V which, as shown above, is proportional to $d$. The direction of the antenna axis 13 is adjustable through servo 14 geared to the rotating platform 3. A dial 15 may be geared to the platform for indicating the value of the drift angle $\theta$ which is the angle between the antenna axis 13 and the longitudinal axis of the aircraft 16 when the apparatus is adjusted to the previously described null.

Returning to FIG. 3, antenna T is continuously fed with high frequency energy from the transmitter 17. The reflected signal received at $R_1$ is applied to mixer 18 where it beats with the frequency of oscillator 19 to produce the intermediate frequency $f$. The frequency of oscillator 19 is also applied to mixer 20 where it beats with frequency $\Delta f$ from oscillator 21 to produce a local oscillator frequency differing from that of oscillator 19 by $\Delta f$. This frequency beats with the signal from $R_2$ in mixer 22 to produce the intermediate frequency $f + \Delta f$. The two intermediate frequencies are applied to the input of intermediate frequency amplifier 23 which has a pass band broad enough to pass both frequencies. This method of amplification insures that any change in amplifier gain will affect both frequencies alike. The frequencies $f$ and $f + \Delta f$ in the output of amplifier 23 are again separated by filter 24, the former being applied to detector 25 to produce video signal $v_1$ corresponding to the signal received at $R_1$ and the latter being applied to detector 26 to produce the video signal $v_2$ corresponding to the signal received at $R_2$. It is desired to delay $v_1$ by the fixed interval $t$ before application along with $v_2$ to subtraction circuit 27. This may be accomplished in any suitable manner such as by means of an acoustic delay line 28 as shown in FIG. 3. The construction and operation of delay lines of this type are well understood in the art. The line is made of a good transmitter of acoustic waves such as quartz with a transducer at the input end for converting electric waves into acoustic waves and a similar transducer at the output end for converting the acoustic waves back into electrical waves. The signal $v_1$ first modulates, in mixer 29, a carrier wave produced by the oscillator 30. The modulated carrier wave is converted by the input transducer to a similar acoustic wave which travels down the line to the output transducer where it is converted back into an electrical wave identical to the input electrical wave. This wave is then demodulated by detector 31 to produce the delayed $v_1$. The signal $r$ appearing in the output of subtraction circuit 27 is equal to the difference between $v_2$ and $v_1$ and its magnitude is displayed by indicator 32.

The operator of the apparatus of FIG. 3 is provided with any suitable means, not shown, for manually controlling the energization to servos 9 and 14 for rotation in either direction. As explained above, when the antenna axis is parallel to the velocity vector and $d = Vt$ the signal $r$ will have a minimum value. This minimum value is theoretically zero but in practice a residue will remain due to transmitter and receiver noise, variations on the ground, unbalance of the two receiver channels and direct coupling between transmitter and receiver channels. The accuracy of velocity vector measurement is determined by the ratio of the average difference of the two received signals, as $d$ or $t$ are varied, and this residue. Prior to a reading, the operator adjusts the apparatus by varying both the antenna axis direction through servo 14 and $d$ through servo 9 until indicator 32 shows a minimum. When a minimum or null for each parameter has been attained the direction of the velocity vector relative to the aircraft axis is indicated by dial 15 and the magnitude of the velocity vector, i.e., the ground speed, is indicated by dial 12.

An obvious modification of FIG. 3 would be to have $d$ fixed and achieve the null by an adjustment of $t$, in which case the magnitude of $t$ rather than the magnitude of $d$ would be indicative of V. This modification is illustrated in FIG. 3b. The variable delay element may be a magnetic storage drum or a cathode-ray storage tube. Variations in drum speed or head position may be used to vary the delay in the case of a magnetic drum, whereas the sweep frequency may be used to control the delay of a delay tube. Dial 12 may be coupled to the delay adjusting mechanism to indicate the value of V which is inversely proportional to $t$ as indicated above.

No information is contained in the residue signal $r$ from which the direction of the error in antenna position can be determined. This is illustrated in FIG. 5 where the surface $s$ shows the relationship between the residual signal $r$ and the antenna positional error $e_1$. The x-y axes of FIG. 5(b) define a horizontal plane through antenna $R_2$. The correct position of $R_2$ is represented by the intersection of the $x$-$y$ axes, $R_2$ being shown at an error distance $e_1$ from its correct position. The magnitude of the residual signal $r$ is measured along an axis normal to the $x$-$y$ plane as shown in FIG. 5(a). The magnitude of $r$ is a direct function of $e_1$ and is independent of the direction of $e_1$. Accordingly the relationship between $r$ and the positioned error $e_1$ is defined by a surface. The horizontal lines in FIG. 5(a) and the circular lines in FIG. 5(b) are contour lines on this surface at various values of $r$. The line $m$ in FIG. 5(a) is the intersection of this surface with the $x$-$r$ plane while the line $n$ represents the intersection of this surface with a plane parallel to the $x$-$r$ plane and containing line $c$-$c$.

The value of $r$ can be reduced to a minimum by first moving $R_2$ along line $c$-$c$ parallel to the $x$-axis whereby $r$ will decrease along line $n$ until $R_2$ reaches the $y$-axis. $R_2$ can then be moved along the $y$-axis until it reaches the $x$-axis at which point $r$ will have its minimum value. If the $x$-axis is taken as the axis through the three antennas (FIG. 3), $R_2$ can be moved parallel to the $x$-axis by adjusting $d$ through servo 9 and parallel to the $y$-axis by adjusting $\theta$ through servo 14.

An automatic method of adjusting the antenna axis direction and the antenna separation is shown in FIGS. 6a-b-c and FIG. 7. Referring again to FIG. 5, it is seen that if the antenna $R_2$ is caused to travel around the circumference of a circle 33 having a center displaced by the distance $e$ from the correct position of $R_2$ which is the center of the $x$-$y$ axes, the amplitude of $r$ will be modulated at the rotational frequency of the antenna. The magnitude of this modulation is zero when $e=0$ and increases as $e$ increases. The phase of this modulation relative to the rotational phase of the antenna gives the direction of $e$. Therefore the amplitude and phase of the modulation are indicative of the magnitude and direction of the positional error $e$ of the antenna. The apparatus of FIGS. 6a-b-c and FIG. 7 utilizes this information to reduce the modulation to zero through adjustment of antenna axis direction and antenna separation to their correct values.

As seen in FIGS. 6a-b-c, antennas $R_1$, T and $R_2$ are supported by a horizontal rotatable platform 3' in a manner similar to that shown in FIG. 3a. The same means as those shown in FIG. 3a may be used for adjusting the antenna axis direction and indicating the drift angle $\theta$, and for adjusting the antenna separation $d$ and indicating V. The guide blocks 4' and 5' which support antennas $R_1$ and $R_2$ differ, however, from corresponding blocks 4 and 5 of FIG. 3 in that they provide means for antenna rotation. The blocks slide in slots 6' and 7' of platform 3'. They are of identical construction, the details of block 5' being shown in FIG. 6c. In this figure antenna $R_2$ is eccentrically mounted on sprocket wheel 35 the hub of which is rotatably supported in the guide block by bearings 36 and 37. The received energy is conducted through a coaxial transmission line 38 located within the hub and through a conventional rotary choke joint 39 to a terminal 40 which permits coupling to the flexible line 11.

The arrangement for rotating the antennas $R_1$ and $R_2$ while also permitting adjustment of the antenna separation $d$ is best seen in FIG. 6b, a bottom view of the platform 3'. Sprocket wheels 34 and 35 are positively coupled together by means of chain 41 which also passes over sprocket wheels 42 and 43 of the same diameter as wheels 34 and 35. The latter two wheels are supported on the platform 3' and their supports are permitted to slide in radial slots 44 and 45. The four wheels are concentric with the four corners of a parallelogram defined by the center lines of equal links 46 and 47, 48 and 49. The manner of attaching these links to the guide blocks 4' and 5' is shown in FIG. 6c. A similar attachment, not shown, is used for the supports of wheels 42 and 43. It will be apparent that changes in the distance $d$ by means of lead screw 8 will cause movement of wheels 42 and 43 in such direction as to maintain constant slack in chain 41. Wheel 42 is simply an idler; however, wheel 43 is driven by motor 50 which is mounted on the sliding support for wheel 43 and acts through this wheel to drive sprocket wheels 34 and 35 and attached antennas $R_1$ and $R_2$, at a constant speed. The rotational phasing of antennas $R_1$ and $R_2$ is such that they are at all times equidistant from antenna T.

A switching arrangement operated by cam 51 is used to sample the amplitude of the signal $r$ at four points in the rotational cycle of the antenna $R_2$. This cam is driven at the same speed as driving sprocket wheel 43 and therefore at the same speed as sprocket wheel 35 carrying antenna $R_2$. The switching arrangement is shown in FIG. 7. Contacts $(k)$, $(l)$, $(m)$, and $(n)$ are spaced 90° about the cam and close for equal short intervals. The phasing is such that the interval during which contacts $(k)$ are closed is centered with respect to the time at which $d$ is a maximum. With this arrangement the contact $(m)$ closure is centered about the time at which $d$ is a minimum and the contact $(l)$ and $(n)$ closures are centered about the times at which the antenna $R_2$ has its maximum transverse displacements relative to the antenna axis 13. Contacts $(k)$ and $(m)$ control the "$d$" servo 9 and contacts $(l)$ and $(n)$ the $\theta$ servo 14. Input terminals 52 are connected to the output of subtraction circuit 27 (FIG. 3).

When there is no antenna positional error ($e=0$ in FIG. 5b) signal $r$ has a constant value and condensers 52-55 acquire equal charges. No voltage therefore exists across the coils of polarized relays 56 and 57 and servos 14 and 9 remain unenergized. When the positional error $e$ has a component parallel to the $x$-axis, condensers 54 and 55 acquire different charges resulting in a current flow through the coil of relay 57. The direction of the current flow is determined by the direction of the error component and causes polarized relay 57 to energize servo 9 for rotation in the forward or backward direction as required to reduce the $x$-axis component of the positional error to zero. A $y$-axis error component is similarly reduced to zero through the action of polarized relay 56 and servo 14.

In the automatic embodiment described above as in the manually adjustable embodiment of FIGS. 3 and 3a, $t$ rather than $d$ may be made the variable parameter. This modification is illustrated in FIG. 8 in which the "$t$" servo 9', operating the variable delay device, replaces the "$d$" servo 9 of FIGS. 6a and 7. In this case, of course, the parts required in FIGS. 6a-b-c to give $d$ its adjustability, such as lead screw 8, servo 9, links 46-49, and slots 6', 7', 44 and 45 are not required.

I claim:

1. Apparatus on an aircraft for continuously indicating the magnitude and direction of the velocity vector of the aircraft, comprising: a transmitting antenna having a downwardly directed wide angle conical pattern; means providing a pair of centers of rotation located at a distance $d$ on either side of said transmitting antenna and on a horizontal axis passing through said transmitting antenna; a pair of receiving antennas, having downwardly directed wide angle conical patterns, mounted so as to have equal eccentricities relative to said centers of rotation; means for rotating said receiving antennas at the same speed and in the same direction about said centers of rotation, the phasing of the rotation being such that the receiving antennas are always equidistant from the transmitting antenna; means for feeding continuous high frequency energy to said transmitting antenna which radiates said energy earthward; means for delaying by an interval $t$ the reflected signal received by one of said receiving antennas; means for subtracting the delayed signal from the reflected signal received by the other receiving antenna to produce a difference signal; means actuated by a first servo for adjusting the ratio $d/t$; means actuated by a second servo for adjusting the direction of said horizontal axis; means synchronized with the rotation of said receiving antennas for comparing the values of said difference signal at the two instances in each rotational cycle of the receiving antennas when the antennas cross said horizontal axis and for energizing said first servo when the compared values are different for operation in such direction as to reduce the difference; means synchronized with the rotation of said receiving antennas for comparing the values of said difference signal at the two instances in each rotational cycle of the receiving antennas when the antennas have their maximum transverse displacement from said horizontal axis and for energizing said second servo when the compared values are different for operation in such direction as to reduce the difference; an indicator coupled to said means for adjusting the ratio $d/t$ for continuously displaying the magnitude of the velocity vector as a quantity proportional to $d/t$; and an indicator coupled to said means for adjusting the direction of said horizontal axis for continuously displaying its direction relative to the longitudinal axis of said aircraft.

2. Apparatus on an aircraft for continuously indicating the magnitude and direction of the velocity vector of the aircraft, comprising: a transmitting antenna having a downwardly directed wide angle conical pattern; means providing a pair of centers of rotation located at a distance $d$ on either side of said transmitting antenna and on a horizontal axis passing through said transmitting antenna; a pair of receiving antennas, having downwardly directed wide angle conical patterns, mounted so as to have equal eccentricities relative to said centers of rotation; means for rotating said receiving antennas at the same speed and in the same direction about said centers of rotation, the phasing of the rotation being such that the receiving antennas are always equidistant from the transmitting antenna; means for feeding continuous high frequency energy to said transmitting antenna which radiates said energy earthward; means for delaying by a predetermined fixed interval the reflected signal received by one of said receiving antennas; means for subtracting the delayed signal from the reflected signal received by the other receiving antenna to produce a difference signal; means actuated by a first servo for adjusting $d$; means actuated by a second servo for adjusting the direction of said horizontal axis; means synchronized with the rotation of said receiving antennas for comparing the values of said difference signal at the two instances in each rotational cycle of the receiving antennas when the antennas cross said horizontal axis and for energizing said first servo when the compared values are different for operation in such direction as to reduce the difference; means synchronized with the rotation of said receiving antennas for comparing the values of said difference signal at the two instances in each rotational cycle of the receiving antennas when the antennas have their maximum transverse displacement from said horizontal axis and for energizing said second servo when the compared values are different for operation in such direction as to reduce the difference; an indicator coupled to said means for adjusting $d$ for continuously displaying the magnitude of the velocity vector as a quantity proportional to $d$; and an indicator coupled to said means for adjusting the direction of said horizontal axis for continuously displaying its direction relative to the longitudinal axis of said aircraft.

3. Apparatus on an aircraft for continuously indicating the magnitude and direction of the velocity vector of the aircraft, comprising: a transmitting antenna having a downwardly directed wide angle conical pattern; means providing a pair of centers of rotation located at predetermined equal distances on either side of said transmitting antenna and on a horizontal axis passing through said transmitting antenna; a pair of receiving antenna, having downwardly directed wide angle conical patterns, mounted so as to have equal eccentricities relative to said centers of rotation; means for rotating said receiving antennas at the same speed and in the same direction about said centers of rotation, the phasing of the rotation being such that the receiving antennas are always equidistant from the transmitting antenna; means for feeding continuous high frequency energy to said transmitting antenna which radiates said energy earthward; means for delaying by an interval $t$ the reflected signal received by one of said receiving antennas; means for subtracting the delayed signal from the reflected signal received by the other receiving antenna to produce a difference signal; means actuated by a first servo for adjusting $t$; means actuated by a second servo for adjusting the direction of said horizontal axis; means synchronized with the rotation of said receiving antennas for comparing the values of said difference signal at the two instances in each rotational cycle of the receiving antennas when the antennas cross said horizontal axis and for energizing said first servo when the compared values are different for operation in such direction as to reduce the difference; means synchronized with the rotation of said receiving antennas for comparing the values of said difference signal at the two instances in each rotational cycle of the receiving antennas when the antennas have their maximum transverse displacement from said horizontal axis and for energizing said second servo when the compared values are different for operation in such direction as to reduce the difference; an indicator coupled to said means for adjusting $t$ for continuously displaying the magnitude of the velocity vector as a quantity inversely proportional to $t$; and an indicator coupled to said means for adjusting the direction of said horizontal axis for continuously displaying its direction relative to the longitudinal axis of said aircraft.

References Cited in the file of this patent
UNITED STATES PATENTS

| | | |
|---|---|---|
| 2,422,064 | Anderson | June 10, 1947 |
| 2,669,710 | Sherr | Feb. 16, 1954 |